Apr. 10, 1923.

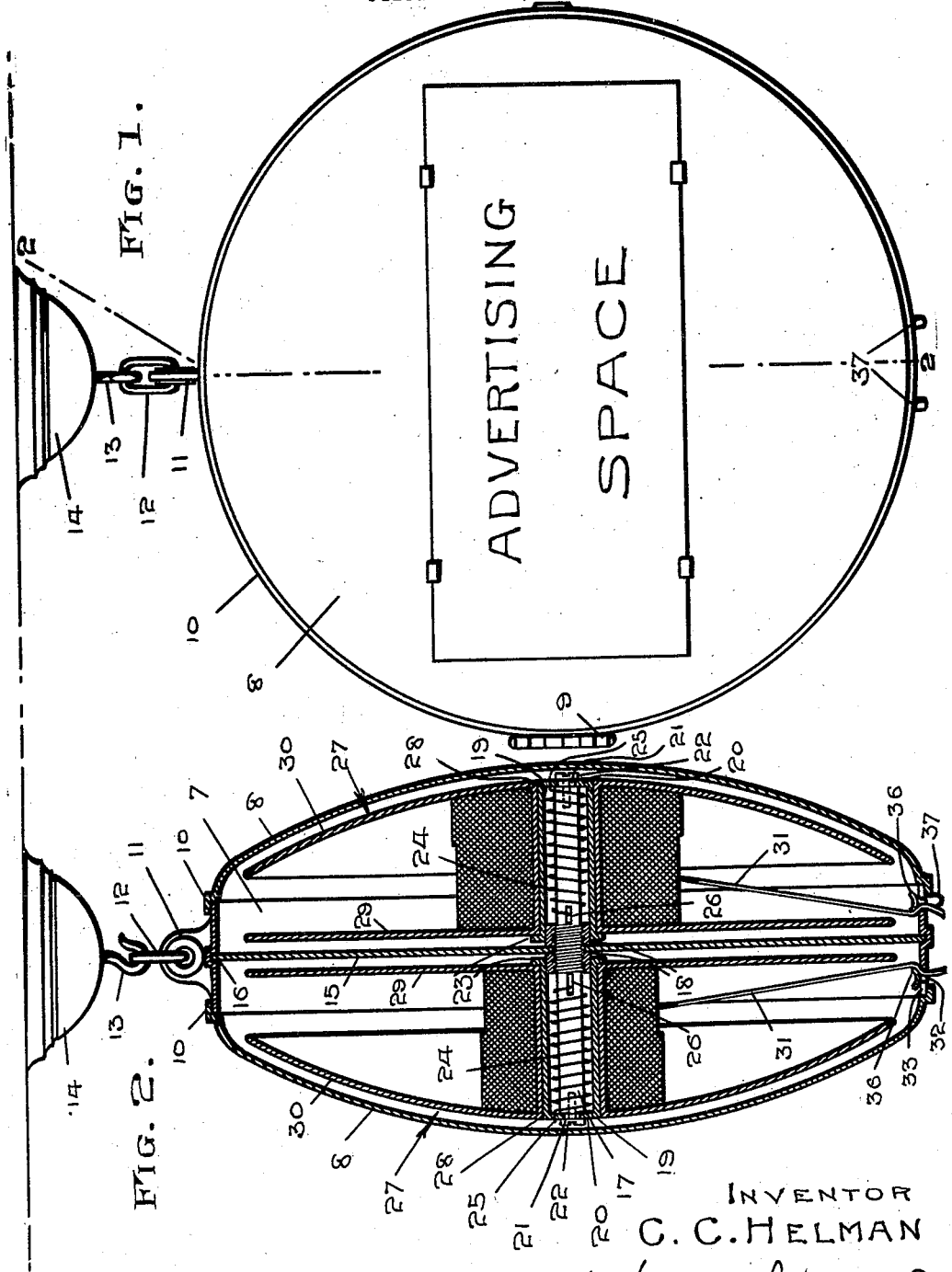

C. C. HELMAN 1,451,300

CORD DISPENSER

Filed June 29, 1921      2 sheets-sheet 2

INVENTOR
C. C. HELMAN
by W. J. Fitz Gerald & Co.
ATTORNEY

Patented Apr. 10, 1923.

1,451,300

UNITED STATES PATENT OFFICE.

CALVIN C. HELMAN, OF CLEVELAND, OHIO.

CORD DISPENSER.

Application filed June 29, 1921. Serial No. 481,304.

*To all whom it may concern:*

Be it known that I, CALVIN C. HELMAN, a citizen of the United States, residing at Cleveland, in the county of Cuyahoga and State of Ohio, have invented certain new and useful Improvements in Cord Dispensers; and I do hereby declare the following to be a full, clear, and exact description of the invention, such as will enable others skilled in the art to which it appertains to make and use the same.

The present invention relates to devices for holding and dispensing cord or string, such as used in stores and elsewhere, or supplying cord or twine for wrapping up and tying bundles and packages, and the invention aims to provide a novel and improved device of that kind including a reel or spool which can hold a large quantity of cord or string.

Another object is the provision of novel means for mounting the reel or spool for the unwinding of the cord therefrom, and arranged, when the cord is broken and released, to wind up the cord a desired amount, to withdraw the terminal thereof out of the way, but still within reach.

A further object is the provision of a cord dispenser including a pair of reels or spools for dispensing two cords or strings, and the construction being compact and simple.

A still further object is the provision of a reel or spool mounting including a spring-returned member mounted for rotation and on which the reel or spool is frictionally mounted, in order that the cord in being unwound from the reel or spool will rotate said member a predetermined amount, for the partial rewinding of the cord when it is released.

Another object of the invention is the provision of a novel spring tension device for the cord to prevent the too free unwinding of the cord and to also offer tension when the cord is rewound or retracted, so as to avoid tangling or excessive movement of the cord either way and to control the rewinding or retraction of the cord.

With the foregoing and other objects in view, which will be understood as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the suspension form of cord dispenser.

Fig. 2 is a vertical diametrical section taken on the line 2—2 of Fig. 1, portions being shown in elevation.

Figure 3:
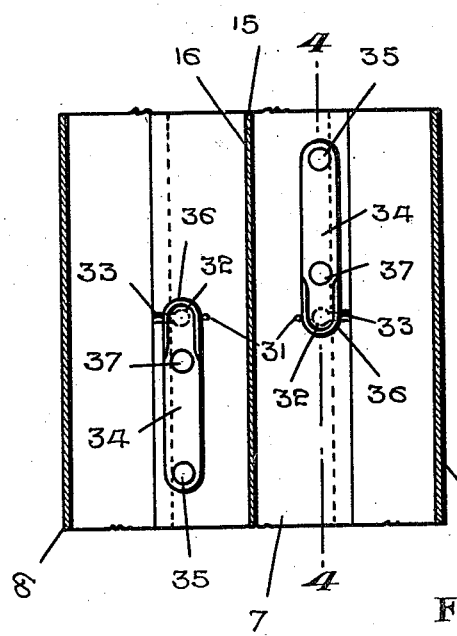
Fig. 3 is an enlarged plan view of the tension devices, showing the casing in section on the line 3—3 of Fig. 4.
Figure 4:
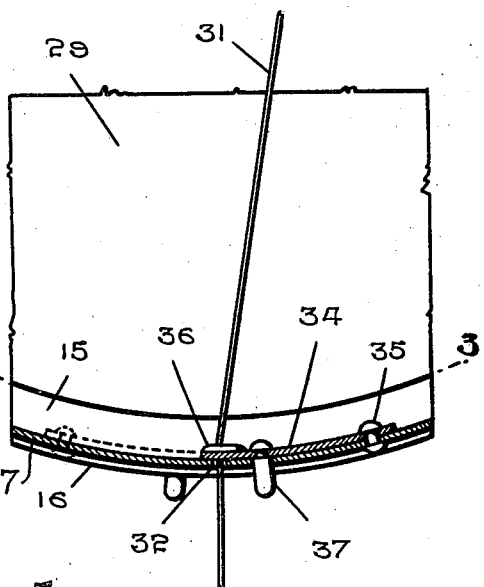
Fig. 4 is a section on the line 4—4 of Fig. 3.

The device, as shown in Figs. 1, 2, 3 and 4, is intended to be suspended from the ceiling or other overhead support, and the casing, which may be of sheet metal or other suitable material, is of circular contour and substantially elliptical diametrical section. The casing includes the annular rim 7 and the convexed sides 8 which are hinged, as at 9, to the rim 7, so that said sides can be swung open for replenishing the cord, and the edges of the sides 8 are offset, as at 10, to fit over the rim 7. The rim 7 has an upstanding apertured ear 11 at the top, for the engagement of a link or chain hanger 12, which can engage a suspension hook 13, or the like, which may be carried by an ornamental supporting member 14 to be secured to the ceiling or other support.

In order to accommodate two spools, the casing has a central partition 15 therein between the sides 8, with its edge seated within an annular groove 16 with which the rim 7 is provided between the edges thereof. The partition 15 supports the means for mounting the spools, as will presently appear.

A spindle 17 extends transversely through the partition 15 centrally of the casing, and is secured to the partition by means of a pair of collars or nuts 18 screw-threaded or otherwise secured on the intermediate portion of the spindle and bearing against the opposite sides of the partition. The double spindle thus projects perpendicularly from the partition at opposite sides, and spool receiving and supporting members 19 are mounted on the double spindle at the opposite sides of the partition. Said members 19 are tubular and have inturned flanges 20 at their outer ends mounted for rotation on the reduced outer ends 21 of the spindle 17, and retaining screws 22 are engaged in the ends of the spindle for holding said members 19 thereon. The inner ends of the members 19 are fitted on the collars 18 for rotation, and have outturned flanges 23. A coiled torsion spring 24 is disposed within each member 19 around the spindle, and its outer end is engaged through the flange 20 of said member, as at 25, while the inner end of the spring is engaged in a slot 26 in the spindle.

A pair of spools or reels 27 are provided to be disposed at the opposite sides of the partition 15 in the two compartments of the casing. Said spools have hubs 28 to fit frictionally on the members 19, and the inner flanges or side plates 29 of the spools are flat to be disposed adjacent to the partition 15, while the outer flanges or side plates 30 are convexed similarly to the sides 8 of the casing. These spools can be readily slid onto the members 19, when the sides 8 of the casing are swung open, and the spools will come to rest against the flanges 23 which serve as stops to limit the movement of the spools on the members 19.

The cords or strings 31 extend downwardly through apertures 32 in the bottom portion of the rim 7, and slots 33 extend from said apertures to the edges of the rim 7, for inserting the cords into said apertures when the spools have been applied to the members 19.

The tension or gripping devices comprise leaf springs 34 secured by rivets 35 or otherwise on the bottom portion of the rim 7, with their free end portions disposed over the apertures 32 and rounded or curved, as at 36, to avoid tearing or cutting the cord. The springs 34 are in reversed positions, as shown, at the opposite sides of the partition 15, and when the cords are inserted through the slots 33 into the apertures 32, they are passed under the springs which clamp or grip the cords with the desired tension between the springs and rim 7. This will slightly impede the movement of the cords in either direction. A push button 37 is secured to each spring 34 and extends slidably downward or outward through the rim 7, for convenience in lifting the spring when threading the cord through the rim 7 and to release the cord so as to be wound back on the spool.

In using the device, when a cord 31 is pulled from the casing, such as when tying up a bundle or package, the cord is unwound from the corresponding spool, thereby rotating the spool, and the frictional engagement of the hub of the spool on the corresponding member 19, will rotate said member with the spool, thereby bringing the corresponding spring 24 under tension. The member 19, however, will only rotate a predetermined amount, until the spring tension overcomes the friction between the member 19 and spool, so that when the cord or string is broken and released, the spool will only be rotated backwardly a predetermined amount, to wind up the cord and retract same, but not excessively, as would be apt to pull the cord out of reach. Thus, although any length of cord can be unwound from the spool, the spool is only rotated backwardly a predetermined amount, to retract the cord the desired distance. The tension devices will prevent the too rapid unwinding of the cords, and will also slightly resist the winding of the cords on the spools when the cords are released. The tension or gripping devices are also of advantage to control the return of the cords. Such devices in gripping or clamping the cords, will only permit the cords to be rewound on the spools when the tension of the springs 24 is sufficient to overcome the friction created by the springs 34. However, by pressing the corresponding button 37, the corresponding spring 34 is moved to releasing position, thereby releasing the cord so that it can be drawn into the casing and wound on the spool, such rewinding or retraction of the cord being stopped the moment the spring 34 is released. In this way, by pressing the buttons 37, with the springs 24 under tension, the cords will be wound back on the spools the desired amounts, and such rewinding or retraction of the cords can be stopped whenever desired, by releasing the buttons 37. In this way, after the cord is pulled from the spool out of the casing, and is partially retracted by the corresponding spring 34, the cord can be further retracted by releasing the corresponding spring 34, leaving the cord free to be wound back on the spool, such retraction of the cord, at the desired position of the terminal of the cord, being stopped when the catch is released by the hand so as to again grip the cord.

Figure 5:
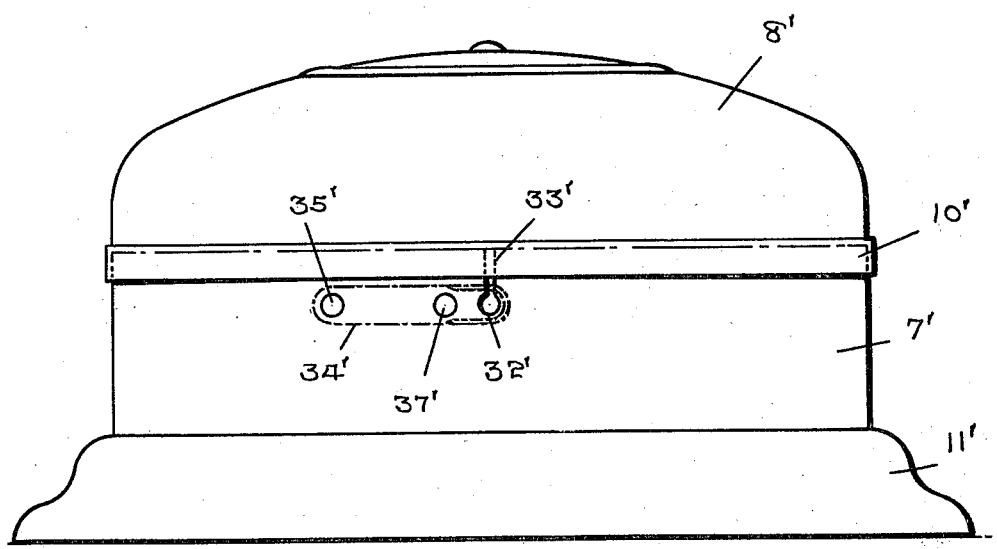
Fig. 5 is an elevation of a modified form of dispenser for use on a counter, table or similar support.

Fig. 5 shows the device as constructed for use on a counter, table or other similar support. The rim 7' of the casing is disposed with its axis vertical, instead of horizontal as in Figs. 1 and 2, and the rim 7' has a base 11', and a removable top 8' resembling one of the sides 8. Said top 8' has its edge 10' offset to fit on the rim 7', and the spool is mounted in the casing in substantially the same way as either spool 27 as hereinbefore described. The rim 7' has an aperture 32' through which the cord or string can extend, with a slot 33' extending from said aperture to the edge of the rim 7', and a tension device or leaf spring 34' is disposed within the rim 7' in substantially the same manner as hereinbefore described, being secured by the rivets 35' and having the push button 37'.

The dispenser can be made in different sizes for various purposes, for holding and dispensing thread, string, cord, twine, and the like. Furthermore, instead of using the spool or reel for holding the twine, string, or cord, a ball or cone of the material can be used, the same fitting in the dispenser in the same manner as the reel or spool, so that such spools, reels, balls, cones, and the like, are substantial equivalents for the purposes of the present invention.

Having thus described the invention, what is claimed as new is:—

1. A cord dispenser including a rotatable member, a spool of cord fitted frictionally on said member for turning said member with the spool and permitting the spool to slip on said member when the member is prevented from turning further with the spool, means for resisting the rotation of said member with the spool and for rotating said member reversely after being turned with the spool, and a tension device for the cord for resisting the reverse movement of the cord by said means and arranged to be manually operated for releasing the cord to be wound back on the spool by the reverse rotation of the spool frictionally with said member and for gripping the cord when the tension device is released.

2. A cord dispenser embodying a rotatable member, a spool of cord fitting frictionally on said member, spring means connected to said member to be brought under tension when said member is rotated frictionally with the spool in unwinding the cord, for limiting the rotation of said member, and to rotate said member and spool reversely, and a tension device for gripping the cord and resisting the reverse movement of said cord by said spring means and operable by a push or touch of the hand for releasing the cord to be rewound on the spool by the reverse movement of the spool with said member.

3. A cord dispenser including a rotatable member for holding a spool of cord, spring means to be brought under tension when said member is turned by the unwinding of the cord, and a tension device including a spring for gripping the cord and resisting the reverse movement of said cord by said means and a push button connected to the spring to be operated manually for releasing the cord.

4. A cord dispenser including a spindle, a member on the spindle, a tubular member for frictionally holding a spool having one end rotatable on the firstnamed member and provided with an outturned flange, the other end of the tubular member having an inturned flange rotatable on the spindle, means engaging the spindle for holding the secondnamed flange thereon, and a coiled torsion spring surrounding the spindle within the tubular member with one end engaged to the secondnamed flange and the other end engaged to the spindle.

5. A cord dispenser comprising a casing, means for mounting a spool for rotation in the casing and operable for resisting the rotation of the spool when unwinding a cord therefrom and for permitting the spool to rotate any amount for unwinding the cord therefrom, said means being operable for rotating the spool reversely when the cord is released, and a tension device for the cord carried by the casing for resisting the reverse movement of the cord by said means and operable manually from the exterior of the casing to release the cord to be wound back on the spool by said means and to grip the cord when the tension device is released.

6. A cord dispenser comprising a casing, means within the casing for mounting a spool of cord for rotation and operable for resisting the rotation of the spool in unwinding the cord therefrom and permitting the spool to rotate any amount in unwinding the cord therefrom, said means being operable for rotating the spool reversely, and a tension device including a spring carried by the casing for gripping the cord and resisting the reverse movement of the cord by said means, said tension device having means operable by a push or touch of the hand for releasing the cord from the exterior of the casing to permit the cord to be wound back on the spool by said means.

7. A cord dispenser comprising a casing, means within the casing for mounting a spool of cord for rotation and for rotating the spool reversely, the casing having an aperture for the outward passage of the cord, and a tension device including a spring secured to the casing on the inside adjacent to said aperture for gripping the cord and resisting the reverse movement of said cord by said means, and a push button extending from the spring to the exterior of the casing to be pushed to release the cord.

8. A cord dispenser comprising a casing having a rim and opposite sides removable from the rim to open position, a partition carried by the rim between said sides, and a double spindle extending through and carried by said partition for supporting a pair of spools for rotation at the opposite sides of said partition.

9. A cord dispenser comprising a casing having a rim and opposite sides removable from the rim to open position, a partition carried by the rim between said sides, and means on the opposite sides of said partition for supporting a pair of spools.

10. A cord dispenser comprising a casing having a rim and opposite sides removable from the rim to open position, a double spindle extending through said partition, collars on the spindle at the opposite sides of the partition to secure the spindle to the partition, tubular members on the spindle at the opposite sides of the partition for frictionally holding spools and having their inner ends rotatable on said collars and their outer ends rotatable on the spindle, and springs within said members connected to the spindle and members for rotating said members reversely.

In testimony whereof I have signed my name to this specification in the presence of two subscribing witnesses.

CALVIN C. HELMAN.

Witnesses:
R. S. WILSON,
O. H. GRAY.